United States Patent
Seyoum et al.

(10) Patent No.: US 10,629,098 B2
(45) Date of Patent: Apr. 21, 2020

(54) PERMANENT SECURITY FILM WITH HIGH TRANSPARENCY AND WITHOUT PREDETERMINED BREAKING POINTS

(71) Applicant: Roehm GmbH, Darmstadt (DE)

(72) Inventors: Ghirmay Seyoum, Egelsbach (DE); Haroldo Rodrigues, Frankfurt (DE); Guenther Dickhaut, Mannheim (DE); Juergen Pachmann, Buerstadt (DE); Detlef Birth, Dieburg (DE)

(73) Assignee: Roehm GmbH, Darmstadt (DE)

( * ) Notice: Subject to any disclaimer, the term of this patent is extended or adjusted under 35 U.S.C. 154(b) by 168 days.

(21) Appl. No.: 15/555,362

(22) PCT Filed: Mar. 23, 2016

(86) PCT No.: PCT/EP2016/056326
§ 371 (c)(1),
(2) Date: Sep. 1, 2017

(87) PCT Pub. No.: WO2016/156137
PCT Pub. Date: Oct. 6, 2016

(65) Prior Publication Data
US 2018/0037776 A1  Feb. 8, 2018

(30) Foreign Application Priority Data

Mar. 31, 2015 (EP) .................... 15161918

(51) Int. Cl.
| | |
|---|---|
| *G06F 3/02* | (2006.01) |
| *C08J 5/18* | (2006.01) |
| *C09J 7/24* | (2018.01) |
| *C09J 7/38* | (2018.01) |
| *C09J 7/22* | (2018.01) |
| *G09F 3/10* | (2006.01) |
| *C08L 33/12* | (2006.01) |
| *G09F 3/02* | (2006.01) |

(52) U.S. Cl.
CPC .................. *G09F 3/02* (2013.01); *C08J 5/18* (2013.01); *C09J 7/22* (2018.01); *C09J 7/24* (2018.01); *C09J 7/38* (2018.01); *G09F 3/10* (2013.01); *C08J 2333/12* (2013.01); *C08L 33/12* (2013.01); *C09J 2201/606* (2013.01); *C09J 2201/622* (2013.01); *C09J 2203/338* (2013.01); *C09J 2433/006* (2013.01); *G09F 2003/0241* (2013.01)

(58) Field of Classification Search
CPC ...... G09F 3/02; G09F 3/10; G09F 2003/0241; G09F 3/08; C09J 7/22; C09J 7/38; C09J 7/24; C09J 2201/606; C09J 2433/006; C09J 2203/338; C09J 2201/622; C08J 5/18; C08J 2333/12; C08L 33/12; B29C 48/305; B29C 48/08; B29C 48/30; C08K 3/22

See application file for complete search history.

(56) References Cited

U.S. PATENT DOCUMENTS

| | | | |
|---|---|---|---|
| 6,280,835 B1 | 8/2001 | Matsui | |
| 2009/0323180 A1* | 12/2009 | Weber | ............ B32B 7/02 359/359 |
| 2011/0027546 A1* | 2/2011 | Hseih | ............ G09F 3/02 428/200 |
| 2012/0018098 A1 | 1/2012 | Henderson | |
| 2013/0343088 A1 | 12/2013 | Parusel et al. | |
| 2015/0279247 A1 | 10/2015 | Henderson | |

FOREIGN PATENT DOCUMENTS

| | | |
|---|---|---|
| DE | 10 2010 062 900 A1 | 6/2012 |
| WO | WO 2010/117771 A1 | 10/2010 |

* cited by examiner

*Primary Examiner* — Nathan L Van Sell
(74) *Attorney, Agent, or Firm* — Oblon, McClelland, Maier & Neustadt, L.L.P.

(57) ABSTRACT

The present invention relates to peelproof security films made from a poly(meth)acrylate, more particularly from a polymethyl methacrylate, which comprises at most 10 wt % of or no impact modifiers. These films are highly transparent, have good printability qualities, and can be applied without intended break points. The peelproof security films can therefore find use in particular in documents, such as passports, for example, in security labels, such as road tax badges, for example, or for product theft prevention, or as price tags. These security labels are further distinguished by good weathering stability and in particular by especially good UV stability.

The present invention relates more particularly to the use of these security labels, which have a thickness of not more than 2 mm, comprise at least 80 wt % of polymethyl methacrylate and contain no impact modification particles.

16 Claims, No Drawings

PERMANENT SECURITY FILM WITH HIGH TRANSPARENCY AND WITHOUT PREDETERMINED BREAKING POINTS

FIELD OF THE INVENTION

The present invention relates to peelproof security films made from a poly(meth)acrylate, more particularly from a polymethyl methacrylate, which comprises at most 10 wt % of or no impact modifiers. These films can be highly transparent, being present as translucent film or even as white film, have good printability qualities, and can be applied without intended break points. The peelproof security films can therefore find use in particular in documents, such as chip cards or passports, for example, in security labels, such as road tax badges, for example, or for product theft prevention, or as price tags. These security labels are further distinguished by good weathering stability and in particular by especially good UV stability.

The present invention relates more particularly to the use of these security labels, which have a thickness of not more than 2 mm, comprise at least 80 wt % of polymethyl methacrylate and contain at most 10 wt % of impact modification particles or no impact modification particles.

PRIOR ART

Security labels which cannot be removed without being destroyed are used in diverse areas of application. These areas of application include the securement of documents, such as of chip cards or passports, for example, security labels, such as road tax badges, for example, labels for securing products against theft, or price tags. A typical prior-art chip card consists for example of up to 12 individual parts, which are assembled and programmed in up to 30 work steps. In such operations, as well as the support layer and the layer that has the magnetic strip, separate laminae are applied for each function. For instance, one or more layers are needed just to realize adequate protection from weathering, protection against scratching, and UV protection. In a further layer, the anti-counterfeit security is obtained by application of a security layer which cannot be removed without being destroyed. The printing as well is often found on a separate layer, since the other layers listed are difficult to print or else result in a defective printed image.

According to the prior art, labels of the kind applied, for example, as road tax badges for adhesive bonding to glass screens generally comprise an optionally printable support layer made of PET, PVC, PE or BOPP. Laminated onto this layer, on one facing side, is a second layer, needed for purposes including stabilization with respect to weathering, lamination being mediated by an interposed pressure-sensitive adhesive. According to the prior art, this second layer is composed generally of polycarbonate, PET or PVC. Since layers of this kind must possess limited brittleness, not least for improved processing, the labels have to be additionally structured, by means of incisions, for example, in order to prevent them being able to be removed without being destroyed. Also, moreover, there are pure PVC films, especially in the form of white films. These films do have a desirably low tear strength. It is possible to ascertain, however, that after they have been torn into, the path to complete rupture is relatively long. This means that a film with minimal tearing, as for example with initial lifting of the security label, may under certain circumstances nevertheless be parted very carefully from the substrate. What would be more desirable here is a more rapid complete rupture.

Problem

In light of the prior art, then, a problem addressed by the present invention was that of providing a method for producing peelproof security films which, without structuring, are realizable with high transparency and/or with a very good printed image.

More particularly, in view of the prior art, a problem addressed here was that of providing a film for security labels that possesses a low tear strength and a short tear path to the complete rupture of the film.

Furthermore, a particular problem addressed by the present invention was that of providing security films which can be produced and processed without tearing.

A further problem addressed by the invention was that the security films, even on prolonged use or after weathering, ought to have particularly good yellowness values and a very high weathering resistance and UV resistance overall.

A problem addressed by the present invention, furthermore, was that of finding security films which in the context of chip card production make a contribution to simplifying the manufacturing operation.

Further problems addressed by this invention may emerge from the description, the prior art and the examples, without being explicitly stated at this point.

Solution

The problems addressed by the invention are solved through the innovative use of polymethacrylate films as security labels. These polymethacrylate films are characterized in that the film has a thickness of between 15 and 120 µm and an elongation at break between 2.0% and 15%, preferably between 4% and 14%.

In accordance with the invention the elongation at break is determined according to ISO 525, but may also be found by the method of ASTM D1004.

Generally speaking, commercial PMMA films, as are used as weathering protection films, for example, have an elongation at break of between 50% and 100%. For the skilled person it is surprising that films having a significantly lower elongation at break can be used as security labels without special perforation. With little effort and complexity, the skilled person is able to set the elongation at break within the range according to the invention. There are also various influencing factors which, by being varied, allow the skilled person to influence the elongation at break in the desired direction. Thus, first of all, the elongation at break falls as a result of an increase in the glass transition temperature, which the skilled person can influence through the exact monomer composition. More particularly, a low fraction or absence of acrylates or methacrylates having relatively long alkyl radicals of more than one carbon atom increases the glass transition temperature.

A second influencing factor is the nature and more particularly the amount of impact modifiers. More particularly, an increase in concentration of the impact modifiers also increases the elongation at break, and so very small amounts or the complete absence of impact modifiers contribute to an elongation at break in accordance with the invention.

In the case of coloured films, more particularly white films, the pigments represent the third influencing factor. Besides transparent embodiments, the films are preferably used with white coloration. For this purpose, for example, titanium dioxide in concentrations of up to 40 wt % is admixed to the matrix material of the film. The higher the concentration of titanium dioxide, the lower the elongation at break, thus providing the skilled person with an additional influencing factor for white films.

These polymethacrylate films are preferably characterized in that the film consists of 55 to 100 wt %, preferably of 70 to 100 wt %, of a polymethacrylate which consists in turn of 80 to 100 wt % of MMA and 0 to 20 wt % of styrene and/or other (meth)acrylates having an alkyl radical having 1 to 4 carbon atoms. The poly(meth)acrylate is preferably composed of 90 to 100 wt % of MMA and of 0 to 10 wt % of acrylates having an alkyl radical having 1 to 4 carbon atoms.

The film here has a thickness of between 15 and 120 μm, preferably between 20 and 75 μm. More particularly the film—in particular in contrast to the prior art—is notable for the fact that the film comprises no or at most 10 wt %, preferably at most 2 wt %, of impact modifiers. Impact modifiers in accordance with the invention are understood as particles which have a soft phase by means of which the impact strength of films or moulding compositions is enhanced. Generally speaking, these are particles of rubber or are poly(meth)acrylate emulsion polymers. These emulsion polymers take the form in general of core-shell or core-shell-shell particles, with the core or middle shell representing a soft phase, usually with a high fraction of acrylates.

The embodiment of a transparent film consists preferably of 90 to 100 wt % of the polymethacrylate. The embodiment of a white security film consists preferably of 55 to 95 wt % of polymethacrylate and comprises preferably between 5 and 40 wt %, more preferably between 20 and 35 wt % of titanium dioxide.

Detailed Configuration of a Line Used Preferably for Producing the Polymethacrylate Films Used in Accordance with the Invention The polymethacrylate film used in accordance with the invention is preferably produced by means of an extrusion process. Used for this purpose in particular is a line which has at least the following components:
an extruder,
a melt pump,
an optional melt filtration facility,
an optional static mixing element,
a flat film die,
a polishing stack or chill roll,
and a winder.

Furthermore, the polymethacrylate films used in accordance with the invention have particularly high resistance to effects of weathering, especially to UV irradiation. In order to boost this quality additionally, UV absorbers and/or UV stabilizers may be added to the polymethacrylate.

The polymethacrylate films used in accordance with the invention are also particularly simple and inexpensive to produce. This is true especially of the preferred process shown for their production. In the extrusion of the polymethacrylate films as well, the brittleness, in spite of the absence of impact modifiers, is so low that the risk of a web break is further minimized, and the film can be produced at high extrusion speeds. The polymethacrylate film can therefore be produced with existing extrusion lines and by known methods, preferably after configuration of the extrusion line as set out earlier on above.

Furthermore, the polymethacrylate films used in accordance with the invention have the advantage that they can easily be cut or diecut to desired formats. Particularly suitable methods for cutting or trimming the polymethacrylate film are laser cutting or laser diecutting.

Extruding polymers into films is widely known and is described for example in Kunststoffextrusionstechnik II, Hanser Verlag, 1986, p. 125 ff. Also set out here are further embodiments of the individual line components.

In the method of the invention, a hot melt is extruded from the die of the extruder onto a nip between two polishing rolls or onto a chill roll. The optimum melt temperature is dependent, for example, on the composition of the mixture and may therefore vary within wide ranges. Preferred temperatures of the PMMA moulding composition up to the point of die entry are in the range from 150 to 300° C., more preferably in the range from 180 to 270° C. and very preferably in the range from 200 to 260° C. The temperature of the polishing rolls is preferably less than or equal to 150° C., more preferably between 60° C. and 140° C.

In one embodiment the temperature selected for the die is preferably higher than the temperature of the mixture prior to die entry. The die temperature is preferably set 10° C., more preferably 20° C. and very preferably 30° C. higher than the temperature of the mixture prior to die entry. Accordingly, preferred temperatures of the die are in the range from 160° C. to 330° C., more preferably 190° C. to 300° C.

The polishing stack used consists for example of two or three polishing rolls. Polishing rolls are widely known in the art, where polished rolls are used to obtain a high gloss. Rolls other than polishing rolls, however, can also be used in the method of the invention. These may be matt rolls, for example. The nip between the first two polishing rolls forms a sheet which becomes a film by virtue of the simultaneous cooling.

The chill rolls used alternatively are also known to the skilled person. Here, the sheet of melt is deposited onto a single cooled roll, which transports it further. On account of the greater ease of installation and operation, chill rolls are preferred over polishing stacks for producing the polymethacrylate films of the invention.

Particularly good surface quality of the polymethacrylate films can be ensured by the die and roll having chrome surfaces, and especially by these chrome surfaces having a roughness Ra (according to DIN 4768) of less than 0.10 μm, preferably less than 0.08 μm.

So that the resulting film is largely free from impurities, a filter is optionally located before the entry of the melt into the die. The mesh size of the filter is guided generally by the starting materials used, and may therefore vary within wide ranges. Mesh sizes generally are in the range from 300 μm to 20 μm. Filters having two or more screens of different mesh size may also be located before the point of die entry. These filters are available commercially. To obtain films of high quality, it is advantageous, moreover, to use particularly pure raw materials.

Optionally, furthermore, a static mixing element may be installed upstream of the flat film die. This mixing element can be used to mix components such as pigments, stabilizers or additives into the polymer melt, or up to 5 wt % of a second polymer, for example in the form of a melt, may be mixed from a second extruder into the PMMA.

The pressure with which the melted mixture is pressed into the die may be controlled, for example, via the speed of the screw. The pressure is situated in general within a range from 40 to 150 bar, without this limiting the method of the invention. Accordingly, the speed with which the films can be obtained in accordance with the invention is generally greater than 5 m/min, more particularly greater than 10 m/min.

In order to ensure uniform conveying of the melt, a melt pump may additionally be installed upstream of the flat film die.

Matrix Materials Used in Accordance with the Invention

The polymethacrylate films used in accordance with the invention are produced using moulding compositions whose principal thermoplastic constituent consists of at least 80 wt %, preferably at least 90 wt % and more preferably at least 95 wt %, of polymethyl methacrylate (abbreviated hereinafter to PMMA). These polymers are obtained generally by radical polymerization of mixtures comprising methyl methacrylate. These mixtures generally contain at least 80 wt %, preferably at least 90 wt % and more preferably at least 95 wt % of methyl methacrylate, based on the weight of the monomers. Particularly high quality is displayed in particular by security labels which consist substantially of polymethyl methacrylate.

In addition, these mixtures may comprise further (meth)acrylates which are copolymerizable with methyl methacrylate. The expression (meth)acrylates encompasses methacrylates and acrylates and also mixtures of both.

In addition to the (meth)acrylates set out above, the compositions for polymerization may also have other unsaturated monomers which are copolymerizable with methyl methacrylate and with the abovementioned (meth)acrylates. Such monomers include, among others, 1-alkenes, acrylonitrile, vinyl acetate, styrene, substituted styrenes or vinyl ethers. All of the monomers recited are used preferably in a high purity.

The weight-average molecular weight Mw of the homopolymers and/or copolymers may vary within wide ranges, with the molecular weight being customarily brought into line with the intended application and with the mode of processing of the moulding composition. Generally speaking, however, it is in the range between 20 000 and 1 000 000 g/mol, preferably 50 000 to 500 000 g/mol and more preferably 80 000 to 300 000 g/mol, without this constituting any restriction. The weight-average molecular weight is determined by means of gel permeation chromatography (GPC) against polystyrene standards.

There are various poly(meth)acrylates which can be used as matrix material for producing the polymethacrylate films used in accordance with the invention, these poly(meth)acrylates differing, for example, in molecular weight or in monomer composition. Moulding compositions particularly preferred in this way are available commercially under the trade name PLEXIGLAS® from Evonik Industries GmbH.

The moulding compositions may comprise customary additives. These include, among others, antistats, antioxidants, light stabilizers and organic phosphorus compounds, weatherproofing agents and plasticizers. The amount of additives, however, is restricted to the intended application. The security films of the invention preferably comprise not more than 10 wt % and more preferably not more than 2 wt % of additives, with security films comprising essentially no additives surprisingly exhibiting performance capability which is out of the ordinary.

The Security Labels

As well as the use described, the application-capable security films as well are themselves a part of the present invention, being distinguished in that the film has a thickness of between 15 and 120 μm and an elongation at break of between 2.0% and 15%, preferably between 4% and 14%, and in that the security film before application has at least the following layers in the order indicated:

a) a polymethacrylate film which consists of 55 to 100 wt % of a polymethacrylate which consists of 80 to 100 wt % of MMA and 0 to 20 wt % of styrene or other (meth)acrylates having an alkyl radical having 1 to 4 carbon atoms, the film being additionally characterized in that it comprises at most 10 wt % of impact modifiers, and in that it has printing on at least one side,
b) a pressure-sensitive adhesive,
c) a release coating and
d) a support layer.

The layer a) preferably has a thickness without printing of between 20 and 100 μm, preferably between 30 and 75 μm. The printing in turn generally has a thickness of between 1.5 and 3 μm, while the layer b) has a thickness of between 20 and 30 μm, the layer c) a thickness of between 0.5 and 1.2 μm and the layer d) a thickness of between 20 and 70 μm.

The stated thicknesses here refer to the average value of the smallest extent of the respective layer, measured perpendicularly to the application surface. The thickness per se is dictated generally by the particular application technology of the individual layers. For example, the printing may be accomplished by means of flexographic printing, digital printing or even screen printing, whereas the pressure-sensitive adhesive may be applied by means of a roller or a doctor. For layers which are present separately before the production of the security film, such as the layers a) and d) in particular, the thickness of the layer may be determined by means of an outside micrometer or similar known devices.

The embodiment of a transparent film consists preferably of 90 to 100 wt % of the polymethacrylate. The embodiment of a white security film consists preferably of 55 to 95 wt % of polymethacrylate and comprises preferably between 5 and 40 wt %, more preferably between 20 and 35 wt % of titanium dioxide.

The extents of the security labels in the other two dimensions can in principle be freely selected and are limited in width by the extrusion die and/or the polishing stack used for their production. This means that the formats are almost infinitely freely selectable.

The trimming of the polymethacrylate film is accomplished preferably by means of diecutting, cutting, laser cutting or laser diecutting. Particular preference is given to laser cutting or laser diecutting.

In one particular embodiment, the security film contains no impact modifiers.

Optionally, but not necessarily, the polymethacrylate films produced in accordance with the invention may be provided additionally with ridges or notches in order further to prevent removal of the labels without their being destroyed. This is actually unnecessary, however, since the polymethacrylate films used in accordance with the invention as peelproof security labels are inherently no longer removable without their destruction, once they have been bonded to a surface.

The security films find use with preference for producing chip cards, documents, security labels, other labels or price tags. One illustrative example of the use is that, for example, of toll stickers which are mounted on the inside of the vehicle screen.

EXAMPLES

Example 1

A moulding composition made up of 98 wt % of a polymethyl methacrylate and 2 wt % of impact modifier, in the form of a core-shell particle, is extruded to a film thickness of 50 μm under the following conditions:

Screw temperature in the extruder: 240 to 270° C.
Die temperature: 240 to 260° C.
Temperature of the melt at the die: 240 to 260° C.
Roll temperature: 50 to 120° C.
An elongation at break of 3% is measured on the material.

Example 2

As Example 1, but using 5 wt % of impact modifier. An elongation at break was measured of 4.5%.

Example 3

Composition: 3
As Example 1, but using 30 wt % of impact modifier and 20 wt % of titanium dioxide. An elongation at break was measured of 8%.

The invention claimed is:

1. A security label, comprising an extruded polymethacrylate film,
    wherein the extruded polymethacrylate film has a thickness of between 15 and 120 μm and an elongation at break of between 2.0% and 15%,
    wherein the extruded polymethacrylate film comprises 55 to 100 wt % of a polymethacrylate which comprises 80 to 100 wt % of MMA and 0 to 20 wt % of styrene and/or other (meth)acrylates comprising an alkyl radical comprising, 1 to 4 carbon atoms,
    wherein the extruded polymethacrylate film further comprises at most 10 wt % of an impact modifier or no impact modifier, and
    wherein the weight-average molecular weight Mw of the polymethacrylate is from 80,000 to 300,000 g/mol.

2. The security label of claim 1, wherein the extruded polymethacrylate film has a thickness of between 20 and 75 μm, and
    wherein the extruded polymethacrylate film comprises 90 to 100 wt % of a polymethacrylate which comprises 90 to 100 wt % of MMA and 0 to 10 wt % of acrylates comprising an alkyl radical comprising 1 to 4 carbon atoms.

3. The security label of claim 1, wherein the extruded polymethacrylate film is colored white and comprises between 5 and 40 wt % of titanium dioxide.

4. The security label of claim 1, wherein a difference between a thinnest point and a thickest point of the extruded polymethacrylate film is at most 5 μm.

5. The security label of claim 1, wherein the extruded polymethacrylate film comprises not more than 2 wt % of additives.

6. The security label of claim 1, wherein the extruded polymethacrylate film comprises essentially no additives.

7. The security label of claim 1, wherein the extruded polymethacrylate film comprises no impact modifier.

8. The security label of claim 1, wherein the extruded polymethacrylate film is produced by an extrusion process wherein a production line used comprises:
    an extruder,
        a melt pump,
        an optional melt filtration facility,
        an optional static mixing element,
        a flat film die,
        a polishing stack or chill roll, and
    a winder,
    wherein the flat film die comprises a die lip comprising actuating elements for adjusting a die lip width, the actuating elements having a distance of 11 to 15 mm from one another, and a die body having an external geometry adapted to a shape of the polishing stack or chill roll, and
    wherein a distance from a melt exit edge to a polishing nip is 80 mm or less.

9. The security label of claim 8, wherein the flat film die is oriented relative to the polishing stack or chill roll with a laser, and
    wherein a parallel deviation of the flat film die relative to the polishing stack or chill roll, measured at the two ends of one outer side of the flat film die, exhibits a maximum deviation of 3 mm.

10. The security label of claim 8, wherein the flat film die and the polishing stack or chill roll have chrome surfaces which have a roughness Ra of less than 0.08 μm.

11. An application-capable security film, which has a thickness of between 15 and 120 μm and an elongation at break of between 2.0% and 15%, and, before application, comprises at least the following layers in the order stated:
    a) the security label of claim 1, with printing on at least one side,
    b) a pressure-sensitive adhesive,
    c) a release coating, and
    d) a support layer.

12. The application-capable security film of claim 11, wherein layer a) has a thickness without printing of between 20 and 75 μm,
    the printing has a thickness of between 1.5 and 3 μm,
    layer b) has a thickness of between 20 and 30 μm,
    layer c) has a thickness of between 0.5 and 1.2 μm and
    layer d) has a thickness of between 20 and 70 μm.

13. The application-capable security film of claim 11, wherein the extruded polymethacrylate film is transparent and comprises 90 to 100 wt % of the polymethacrylate.

14. The application-capable security film of claim 11, wherein the extruded polymethacrylate film is colored white and comprises 55 to 95 wt % of polymethacrylate and 5 to 40 wt % of titanium dioxide.

15. The application-capable security film of claim 11, wherein the extruded polymethacrylate film comprises no impact modifier.

16. A chip card, document, security label, other label or price tag, comprising the application-capable security film of claim 11.

* * * * *